Patented Nov. 18, 1952

2,618,661

UNITED STATES PATENT OFFICE 2,618,661

TRITHIOACETALS

Frank Peter Doyle and John David Kendall, Ilford, England, assignors to Ilford Limited, Ilford, England, a British company No Drawing. Application May 14, 1949, Serial No. 93,403. In Great Britain May 19, 1948

11 Claims. (Cl. 260—609)

This invention relates to the production of trithioacetals and particularly to the production of trithioacetals of either of the general isomeric formulae:

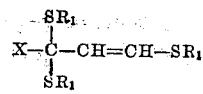

and

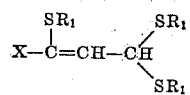

where X is an alkyl or aryl group and $R_1$ is an alkyl or aralkyl group.

According to the present invention trithioacetals of general Formula I or II are prepared by reacting an aldehyde of general Formula III:

   III which can exist in either of the two tautomeric forms:

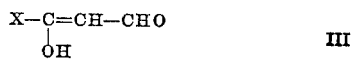   IIIa or

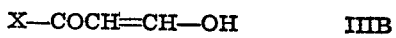   IIIB or a salt thereof, with an alkyl or aralkyl mercaptan of the formula $R_1SH$ where $R_1$ is an alkyl or aralkyl group.

Salts of the aldehydes are formed by replacing the hydrogen atom of the hydroxy group with, for example, an atom of sodium.

The reaction is preferably effected in the presence of a strong acid, e. g. sulphuric or phosphoric acid or, for preference, hydrochloric acid. A diluent, e. g. diethyl ether, may be present.

The group X may be, for example, methyl, ethyl, propyl or butyl or higher alkyl, or phenyl or naphthyl. $R_1$ may be any of the foregoing alkyl groups, or an aralkyl group such as benzyl or naphthyl methyl.

The following examples serve to illustrate the invention:

EXAMPLE 1

ω-Formyl acetone trithioacetal 13.5 parts of sodio formyl acetone were covered with 40.0 parts of ethyl mercaptan and 50 parts of dry ether. Dry HCl gas was then passed for 3 hours, when all the solid dissolved and the liquors turned dark red. The solution was left overnight, then poured into excess sodium carbonate solution, extracted with ether, washed, dried over anhydrous sodium sulphate and the ether removed by distillation. The product was distilled under reduced pressure when it was obtained as a dark yellow semi-viscous oil, B. P. 210–213° C. at 9 mm. pressure.

EXAMPLE 2

ω-Formyl acetophenone trithioacetal 90 parts of sodio formyl acetophenone were covered with 150 parts of ethyl mercaptan. Dry HCl gas was passed in for 3 hours resulting in the solution of the sodium salt and deepening of the colour. After treatment as in the above example, the trithioacetal was distilled, B. P. 198–203° C. at 10 mm. pressure, to give a yellow-brown viscous oil.

EXAMPLE 3

α-Formylethyl-methyl-ketone trithioacetal 90 parts of sodio α-formyl ethyl-methyl ketone were covered with 216 parts of ethyl mercaptan and treated as in the Examples 1 and 2. The trithioacetal was distilled at 180–190° C. at 10 mm. pressure as a yellow oil.

The products of this invention are of value in the preparation of dyestuff intermediates as described in co-pending United States application No. 93,405, filed May 14, 1949, now abandoned, corresponding to British patent application No. 13,646/48, and in the preparation of dicarbocyanine dyestuffs as described in co-pending United States application No. 93,406, filed May 14, 1949, now abandoned, corresponding to British patent application No. 13,648/48.

What we claim is:

1. Process for the production of a mercaptal which comprises mercaptalising, in the presence of a strong acid, a compound selected from the class consisting of aldehydes of the general formula:

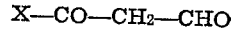

where X is a group selected from the class consisting of alkyl and aryl and their tautomers and sodium salts, with a mercaptan selected from the class consisting of alkyl and aralkyl mercaptans.

2. Process for the production of a mercaptal which comprises mercaptalising, in the presence of a strong inorganic acid, a compound selected from the class consisting of aldehydes of the general formula:

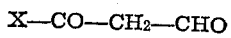

where X is a group selected from the class consisting of alkyl and aryl and their tautomers and sodium salts, with a mercaptan selected from the class consisting of alkyl and aralkyl mercaptans.

3. Process for the production of a mercaptal which comprises mercaptalising, in the presence of hydrochloric acid, a compound selected from the class consisting of aldehydes of the general formula:

$$X-CO-CH_2-CHO$$

where X is a group selected from the class consisting of alkyl and aryl and their tautomers and sodium salts, with a mercaptan selected from the class consisting of alkyl and aralkyl mercaptans.

4. Process for the production of a mercaptal which comprises mercaptalising, in the presence of hydrochloric acid and an inert diluent, a compound selected from the class consisting of aldehydes of the general formula:

$$X-CO-CH_2-CHO$$

where X is a group selected from the class consisting of alkyl and aryl and their tautomers and sodium salts, with a mercaptan selected from the class consisting of alkyl and aralkyl mercaptans.

5. A process as set forth in claim 4 wherein said aldehyde compound is sodio formyl acetone and said mercaptan is ethyl mercaptan.

6. A process as set forth in claim 4 wherein said aldehyde compound is sodio formyl acetophenone and said mercaptan is ethyl mercaptan.

7. A process as set forth in claim 4 wherein said aldehyde compound is sodio α-formyl ethyl-methyl ketone and said mercaptan is ethyl mercaptan.

8. A mercaptal produced by mercaptalising in the presence of a strong acid, a compound selected from the class consisting of aldehydes of the general formula:

$$X-CO-CH_2-CHO$$

where X is a group selected from the class consisting of alkyl and aryl and their tautomers and sodium salts, with a mercaptan selected from the class consisting of alkyl and aralkyl mercaptans.

9. A mercaptal produced by mercaptalising sodio formyl acetone with ethyl mercaptan in the presence of a strong acid.

10. A mercaptal produced by mercaptalising sodio formyl acetophenone with ethyl mercaptan in the presence of a strong acid.

11. A mercaptal produced by mercaptalising sodio α-formyl ethyl-methyl ketone with ethyl mercaptan in the presence of a strong acid.

FRANK PETER DOYLE.
JOHN DAVID KENDALL.

REFERENCES CITED

The following references are of record in the file of this patent:

UNITED STATES PATENTS

| Number | Name | Date |
| --- | --- | --- |
| 2,412,814 | Kendall | Dec. 17 1946 |